L. W. BUGBEE.
GRINDING MACHINE.
APPLICATION FILED MAR. 12, 1917.
1,245,865.
Patented Nov. 6, 1917.
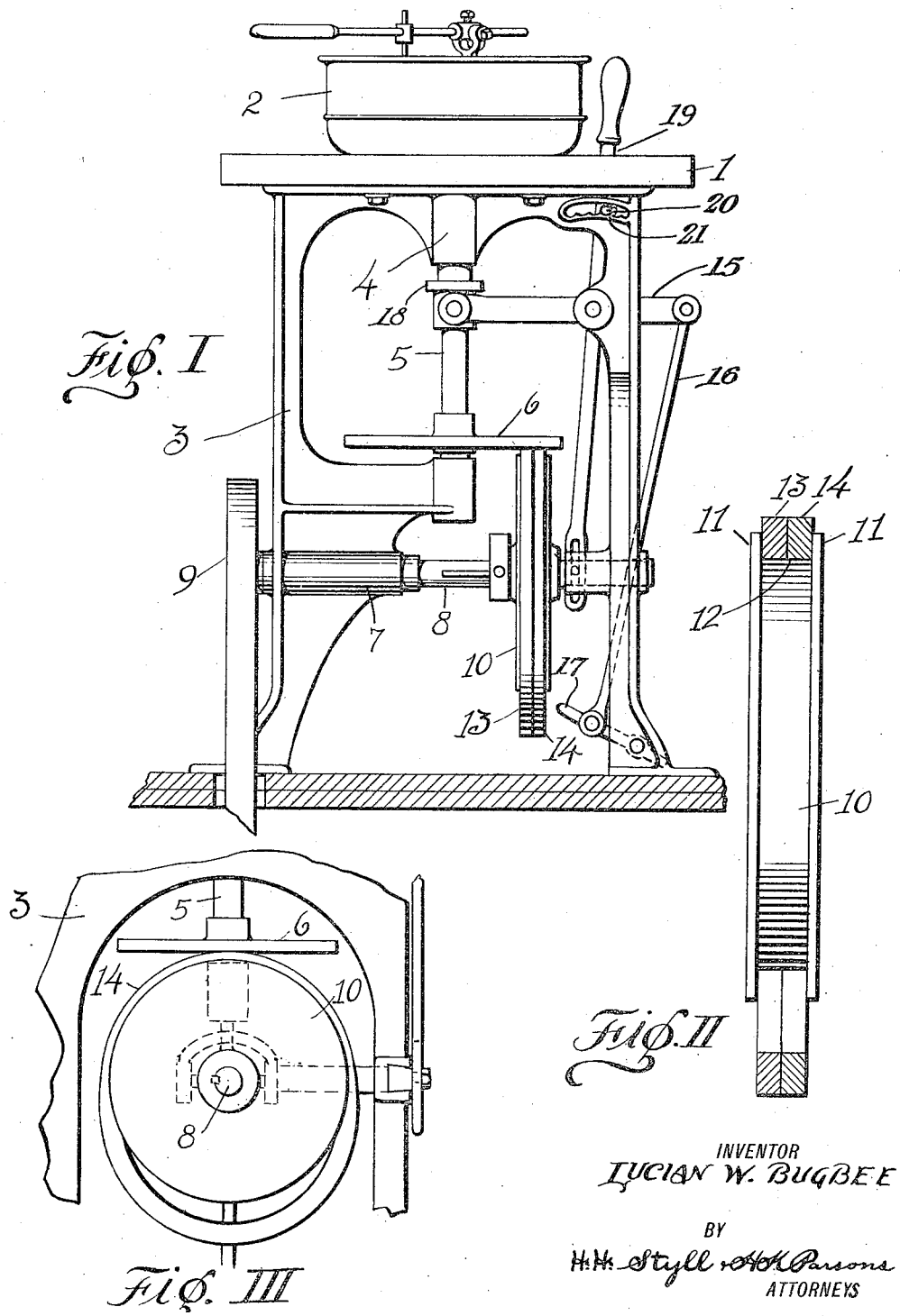
Fig. I
Fig. II
Fig. III
INVENTOR
LUCIAN W. BUGBEE
BY
H. H. Styll  H. K. Parsons
ATTORNEYS

UNITED STATES PATENT OFFICE.

LUCIAN W. BUGBEE, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

GRINDING-MACHINE.

1,245,865.      Specification of Letters Patent.      Patented Nov. 6, 1917.

Application filed March 12, 1917. Serial No. 154,330.

*To all whom it may concern:*

Be it known that I, LUCIAN W. BUGBEE, a citizen of the United States, residing at Southbridge, in the county of Worcester and State of Massachusetts, have invented certain new and useful Improvements in Grinding-Machines, of which the following is a specification.

My invention relates to improvements in grinding machines and has particular reference to an improved machine especially adapted for use in the surfacing of opthalmic lenses.

One of the leading objects of my present invention is the provision of a machine of this character in which the speed of operation may be readily varied as desired according to whether roughing, fining or polishing work is to be done upon the machine.

A further object of the present invention is the provision of improved means for connecting the parts for such variable speed driving which will permit of the elimination of gears or the like and at the same time insure satisfactory wear and operation of the parts, and which will permit of ready replacement of the worn parts as required.

Other objects and advantages of my improved construction should be readily apparent by reference to the following specification taken in connection with the accompanying drawings, and it will be understood that I may make any modifications in the specific details of construction shown and described within the scope of the appended claims without departing from or exceeding the spirit of my invention.

Figure I represents a front elevation of my complete machine.

Fig. II represents a sectional view of my improved driving connection.

Fig. III represents a side elevation of the construction illustrated in Fig. II.

In the drawings, the numberal 1 denotes the table for my improved machine having mounted thereon the usual bowl 2 and having depending therefrom the frame work 3, including the vertical bearing 4 for the shaft 5 bearing the friction wheel 6 and the horizontal bearing 7 for the shaft 8 driven at its outer end as from the pulley 9 and bearing on its inner end the drive pulley or wheel 10.

I have here illustrated as applied to a lens surfacing machine what is known as a friction drive or drive eliminating the use of gears.

It is well known, however, that drives of this sort are open to certain disadvantages due to the fact that the wheel or disk 6 and disk 10 operating on shafts whose axes are at right angles one to the other subject the driving surface of the member 10 to a constant torsional or twisting wear so that ordinarily the life of a drive of this sort is relatively short and it is necessary to frequently repair or replace the disk 10, while at the same time the disk wears unevenly and this is liable to interfere with the efficient operation of the machine.

It is the particular purpose of my invention, therefore, to provide a drive which may satisfactorily be employed in connection with as delicate a machine as one required for the surfacing of lenses for optical purposes. In the attainment of this result I form the drive wheel or pulley 10 with the lateral flanges 11, providing the groove 12 adapted to receive a plurality of belts, two belts, 13 and 14, having been illustrated in the particular instance, although it will be understood that additional ones may be employed if desired. Attention is called to the fact that these belts in place of fitting tightly within the groove 12 are of larger diameter than the side flanges 11 and consequently may be quickly slipped on or off thereof when desired to repair or replace the parts, and hang therebelow and provide a friction between the upper surface of the groove and the under surface of the disk or driven wheel 6, and are capable of relative movement regarding both of the parts as under undue resistance applied to the shaft 5, this slipping eliminates to a very great extent the liability of wearing flat of the parts as occurs in connection with ordinary friction drives.

In addition by the provision of a plurality of loose belts in place of a single rigid surface I am able to eliminate the wear due to torsional strain, since in place of a single surface being subjected as an entirety to this strain I have a broken up surface, each of the parts being capable of movement relatively to the other, rendering the contacting surface flexible and the parts relatively shifting to take care of the strain and also facilitating interchangement of the parts and the substitution of the inner for the outer, or vice versa, at frequent intervals so that the wear may be equally distributed between the belts 13 and 14 for the driving connection.

It will be noted that the shaft 5 is mounted for vertical sliding movement, which movement may be imparted to the shaft through the medium of the lever 15 intermediately pivoted to the frame and connected by the link 16 with the treadle member 17, the other end of the lever 15 engaging the shift collar 18 on the shaft whereby depression of the treadle will serve to slightly raise the shaft 5 and move the wheel 6 out of engagement with the driving belt. Similarly, to control the speed of the machine the shift lever 19 is intermediately pivoted to the frame and has suitable engagement with the member 10 to impart a lateral sliding movement to said member along the shaft 8 so that this member may be horizontally shifted as desired, while the member 6 and shaft 5 are vertically shifted, a latch member 20 on the lever 19 engaging with the segment on the frame surface to lock the member 10 in desired adjusted position.

I claim:

1. In a lens surfacing machine, the combination with a vertical shaft and a horizontal shaft, of a driving member carried by one of said parts and a driven member mounted on the other, and a frictional connection between the driven and driving members including a belt or contact maker of loose laminated form, the driven and driving members engaging opposite edges of the laminations whereby the several parts may shift relatively to each other to take up torsional strain.

2. In a friction drive, the combination with a driven and a driving member disposed at right angles one to the other, one of said members being in the form of a flanged pulley, of means for frictionally connecting the parts, comprising a plurality of belts fitting in the grooves of the flanged pulley and capable of relative rotation about the flanged pulley to compensate for torsional strain on the friction member during the driving action of the parts.

3. In a device of the character described, the combination with a rotatable disk, of a rotatable pulley disposed at right angles thereto and provided with a central groove and a plurality of belts of greater diameter than the pulley loosely fitting within the groove and arranged side by side and projecting above the surface of the pulley for engagement with the disk whereby a variable friction contact surface with relatively shiftable inner and outer portions is provided, substantially as described.

4. A driving connection for a machine of the character described, comprising a disk and a pulley disposed at right angles one to the other, the pulley having a groove, and a frictional connection between the disk and pulley comprising a member loosely mounted in the groove of the pulley and bearing tightly against the pulley and adjacent portion of the face of the disk, substantially as illustrated.

5. In a friction drive, the combination with a driving and a driven member disposed at right angles to one another, one of said members being in the form of a flanged pulley, of means for frictionally connecting the parts, comprising a belt fitting in the groove of the flanged member and of greater length than the periphery of the flanged member whereby flattening of the driven and driving members due to relative slipping of the parts is reduced to a minimum.

6. A lens surfacing machine including a vertical and a horizontal shaft, a disk fixed on the vertical shaft, means for vertically shifting the shaft and disk, a flanged pulley slidably mounted on the other shaft, means for horizontally shifting the pulley, and a driving connection between the pulley on the one shaft and the disk on the other, comprising a belt loosely received between the flanges of the pulley and frictionally engaging the pulley and disk whereby driving force is normally imparted to the disk from the pulley.

In testimony whereof I affix my signature in the presence of two witnesses.

LUCIAN W. BUGBEE.

Witnesses:
EDITH M. HALVORSEN,
H. K. PARSONS.